United States Patent
Pollklas et al.

(10) Patent No.: US 7,721,515 B2
(45) Date of Patent: May 25, 2010

(54) AGRICULTURAL HARVESTING MACHINE WITH A FOREIGN-OBJECT DETECTION DEVICE

(75) Inventors: Manfred Pollklas, Rheda-Wiedenbrueck (DE); Andreas Clausing, Augustdorf (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 0 days.

(21) Appl. No.: 12/128,821

(22) Filed: May 29, 2008

(65) Prior Publication Data

US 2008/0295471 A1    Dec. 4, 2008

(30) Foreign Application Priority Data

May 30, 2007    (DE)    .................. 10 2007 025 310

(51) Int. Cl.
   *A01D 75/18*    (2006.01)
   *A01F 12/16*    (2006.01)
   *G01V 3/08*    (2006.01)

(52) U.S. Cl. .................................... 56/10.2 J

(58) Field of Classification Search ................ 56/10.2 J, 56/60, 11.9, 10.9, 62, 64; 324/232; 460/2, 460/3
See application file for complete search history.

(56) References Cited

U.S. PATENT DOCUMENTS

| | | | | |
|---|---|---|---|---|
| 3,959,953 | A | * | 6/1976 | Garrott ........................... 460/3 |
| 4,322,937 | A | * | 4/1982 | Hollmann ....................... 460/3 |
| 4,720,963 | A | | 1/1988 | Weiss et al. |
| 4,776,154 | A | | 10/1988 | Weiss et al. |
| 4,805,385 | A | * | 2/1989 | Bohman et al. ............ 56/10.2 J |
| 5,325,670 | A | * | 7/1994 | Iino ............................ 60/468 |
| 5,921,071 | A | * | 7/1999 | Paquet et al. ................. 56/16.6 |
| 6,105,347 | A | * | 8/2000 | Behnke .................... 56/10.2 J |
| 6,324,822 | B1 | * | 12/2001 | Oliva ........................ 56/10.2 J |
| 6,510,679 | B2 | * | 1/2003 | Krone et al. ................... 56/62 |
| 6,560,953 | B2 | * | 5/2003 | Rauch ........................... 56/64 |
| 6,564,549 | B2 | * | 5/2003 | Nagura et al. ................. 60/436 |
| 7,022,012 | B2 | * | 4/2006 | Heinsey et al. ................. 460/2 |
| 7,140,169 | B2 | * | 11/2006 | Ameye et al. ................. 56/11.9 |
| 7,464,525 | B2 | * | 12/2008 | Dueckinghaus et al. ... 56/10.2 J |
| 2003/0172638 | A1 | * | 9/2003 | Ameye et al. ............. 56/16.4 R |
| 2005/0083049 | A1 | * | 4/2005 | Brune et al. ................. 324/232 |
| 2006/0174600 | A1 | | 8/2006 | Behnke et al. |

FOREIGN PATENT DOCUMENTS

| | | |
|---|---|---|
| DE | 247 117 | 7/1987 |
| DE | 247 118 | 7/1987 |
| DE | 10 2005 005 736 | 9/2006 |

* cited by examiner

*Primary Examiner*—Árpád Fábián-Kovács
(74) *Attorney, Agent, or Firm*—Michael J. Striker

(57) ABSTRACT

An agricultural harvesting machine for harvesting and/or processing crop material has a transfer device for transferring crop material, an intake device that includes a foreign-object detection device for detecting foreign objects in a monitoring region of a crop material flow, in the case of which, when a foreign object in the crop material flow is detected by the foreign-object detection device, the agricultural harvesting machine is braked automatically, and/or at least one energy storage medium is withdrawn in order to reduce the ground speed, it being possible to adjust the value for the braking effect and/or the withdrawal of the energy storage medium.

16 Claims, 3 Drawing Sheets

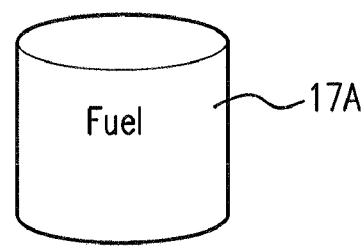
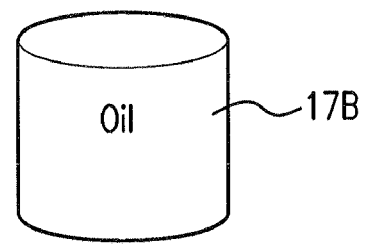
FIG. 1A
FIG. 1B
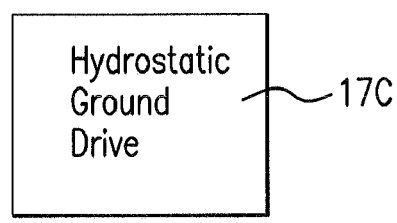
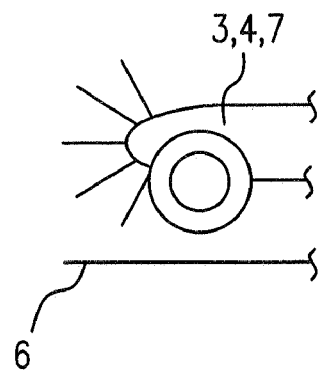
FIG. 1C
FIG. 1D

AGRICULTURAL HARVESTING MACHINE WITH A FOREIGN-OBJECT DETECTION DEVICE

CROSS-REFERENCE TO A RELATED APPLICATION

The invention described and claimed hereinbelow is also described in German Patent Application DE 10 2007 025 310.0 filed on May 30, 2007. This German Patent Application, subject matter of which is incorporated herein by reference, provides the basis for a claim of priority of invention under 35 U.S.C. 119(a)-(d).

BACKGROUND OF THE INVENTION

The present relates to an agricultural harvesting machine with an intake device for conveying harvested crop material to downstream processing assemblies. The intake device is equipped with a foreign-object detection device for detecting foreign objects in the crop material flow, and with devices for braking the conveyance devices immediately when a foreign object is detected in the crop material.

Conveyance devices in the form of front harvesting attachments with foreign-object detection devices are typically used in agricultural harvesting machines, in forage harvesters in particular, in order to detect metal objects that may have entered the machine along with the crop material, e.g., an auger tine, a fence stake, an aluminum can, or a nail, and to then automatically shut off the conveyance device and downstream processing assemblies. The purpose is to prevent the metal objects from causing damage inside the agricultural harvesting machine and to ensure that they are removed before the crop material is fed to animals, who could ingest them and suffer injury or even death. In a typical design, a conveyance device of this type is composed of one or more pairs of intake rollers installed in series. Crop material that is picked up by a front harvesting attachment of the harvesting machine is drawn in by the rollers and directed, e.g., to a downstream chopper drum or another working unit.

A foreign-object detection device of this type is made known in DD 247 117 A3, with which a metal detector is located in a conveying roller that interacts with another conveying roller. The metal detector is typically fixed in position inside one of the front intake rollers. The detection region of the metal detector is formed by a magnetic measurement field generated by the magnet system. The magnetic measurement field is preferably oriented into the crop material flow, nearly perpendicularly from below, and/or often diagonally toward the front, in the direction of the front harvesting attachment. The detector signal that is measured is measured continually and compared with a predefined threshold value. If the threshold value is exceeded, a shut-off signal is sent to the conveyance device.

Foreign-object detection devices designed as stone detectors are also known, which are designed to protect the working units from damage caused by stones embedded in the crop material. A foreign-object detection device of this type is made known in DD-PS 247 118, with which acceleration is measured and evaluated at a part of the conveyance device that is movable perpendicularly to the conveyance device. When a certain acceleration threshold is exceeded, a stop signal is triggered and transmitted to the devices that brake the conveyance elements.

The disadvantage of the known foreign-object detection devices and their use in agricultural harvesting machines is that the agricultural harvesting machine is no longer able to pick up crop material, because all of the working units have stopped. Crop material can become jammed since, due to the operator's reaction time, a certain length of time passes from the instant when the foreign-object detection device is triggered until the harvesting machine is stopped. In particular, a forage harvester that is harvesting grass travels at high harvesting speeds. As a result, when a foreign object is detected, large swaths of grass are pushed in front of the forage harvester before it comes to a standstill. When it becomes necessary for the harvesting machine to pick up these piles of crop material after the foreign object has been removed, the harvesting machine often becomes overloaded, which may result in damage being done to the harvesting machine. If the crop material is a crop that is yet to be harvested, e.g., corn, it is driven over and pressed into the ground. Significant crop-material losses may therefore result if the foreign-object detection device is activated frequently.

SUMMARY OF THE INVENTION

The object of the present invention, therefore, is to avoid the disadvantages of the cited related art and to refine an agricultural harvesting machine that includes a foreign-object detection device of the type described initially such that, when a foreign object is detected by the foreign-object detection device, it is largely prevented that crop material will become jammed and/or driven over and pressed into the ground.

In keeping with these objects and with others which will become apparent hereinafter, one feature of the present invention resides, briefly stated, in an agricultural harvesting machine for harvesting and/or processing crop material, comprising a transfer device for transferring a crop material; an intake device including a foreign-object detection device for detecting foreign objects in a monitoring region of a crop material flow; means for braking the agricultural harvesting machine and/or withdrawing at least one energy storage medium in order to reduce the ground speed than a foreign object of the crop material flow is detected by said foreign-objection detection device; and means for adjusting a value of a braking effect and/or a withdrawal of said energy storage medium.

Given that, when the foreign-object detection device detects a foreign object in the crop material flow, the harvesting machine is braked automatically and/or the at least one energy storage medium is withdrawn in order to reduce the ground speed of the agricultural harvesting machine, it is ensured that crop material—such as grass that has been laid down in swaths—is largely prevented from becoming jammed, and that crop material yet to be harvested, such as corn, is largely prevented from being driven over and pressed into the ground. Advantageously, the value for the braking effect and/or the reduction of the ground speed is adjustable, so that, due to the option of varying the setting, the optimal setting for a particular situation or harvesting condition may always be selected. Preferably, the at least one energy storage medium is the fuel used to operate the drive engine, and/or the oil used to operate a hydrostatic ground drive of the agricultural harvesting machine.

The operator of the harvesting machine is advantageously relieved of tasks, since it is possible to adjust the braking and/or withdrawal of the at least one energy storage medium—as a function of at least one threshold value, e.g., the crop material type, the ground speed of the agricultural harvesting machine, or the incline of the field of crops—in order to reduce the ground speed of the harvesting machine and bring the harvesting machine to a standstill when a foreign object has been detected. In particular, the harvesting operation is carried out at different harvesting speeds depending on the crop material type. When a foreign object is detected, the value for the braking effect and/or the withdrawal of the at least one energy storage medium is adjustable such that, e.g., when the harvesting operation is being carried out at a high rate of speed, a nearly complete braking of the agricultural harvesting machine is prevented, in order to protect the operator of the harvesting machine—who is typically not forewarned—from becoming injured.

It is also advantageous that the values for the braking effect and/or the reduction in ground speed are adjusted depending on the inclination of the field of crops, so that, when traveling downhill in particular, it is also possible to avoid stopping the harvesting machine too abruptly and therefore having the front harvesting attachment of the harvesting machine come in contact with ground, thereby preventing damage to the crops to be harvested and to the front harvesting attachment. It is also advantageously possible to consider the harvesting speed of the harvesting machine and the weight of the front harvesting attachment per se when adjusting the value for the braking effect and/or for the reduction of the at least one energy storage medium, both of which affect the braking of the harvesting machine.

In an advantageous refinement of the present invention, the threshold values may be set manually, thereby enabling the operator to control the adjustment of the value for the braking effect and/or for the withdrawal of the at least one energy storage medium as he sees fit. It is also feasible for the threshold values of the related harvesting operation parameters to be registered automatically via related sensors, thereby relieving the driver of a monitoring task so he may concentrate solely on the harvesting operation.

With a particularly preferred exemplary embodiment, the braking and/or withdrawal of the at least one energy storage medium is carried out to reduce the ground speed of the harvesting machine depending on the speed setpoint value specified via the ground speed control lever. The operator therefore has more control over the way the braking procedure is initiated when a foreign object is detected than if he would move the ground speed control lever from the currently selected ground speed position into the neutral position, thereby avoiding potential injury to the operator.

In a further advantageous refinement of the present invention, when a foreign object is detected in the crop material flow, the ground speed is reduced using at least one signal means, which is preferably acoustic and/or optical, thereby ensuring that the operator of the harvesting machine itself or operators of other vehicles are notified that a foreign object was detected in the crop material flow.

In an advantageous embodiment of the present invention, the signal means is the brake light device of the harvesting machine, to ensure that a vehicle traveling behind the harvesting machine is notified when a foreign object has been detected in the crop material flow, thereby allowing it to initiate a braking procedure itself in a timely manner in order to avoid colliding with the harvesting machine traveling in front of it.

Given that the braking and/or withdrawal of the energy storage medium takes place after a foreign object is detected in the crop material flow when the transfer device is located in a rear transfer position, it is ensured that the operators of the vehicles traveling behind the harvesting machine have enough reaction time left in order to initiate a braking procedure or an evasive maneuver themselves, in order to avoid colliding with the harvesting machine traveling in front of them.

In an advantageous refinement of the present invention, when a foreign object is detected in the crop material flow, the transfer device is swiveled in the direction of travel when the transfer device is located in a lateral transfer position, the swiveling of the transfer device taking place in relation to the value for the braking effect and/or the withdrawal of the energy storage medium in order to reduce the ground speed of the harvesting machine. It is therefore ensured that no crop material is lost in the harvesting operation during the process of transferring crop material to a vehicle traveling alongside if that vehicle does not initiate its braking procedure at the same time and with the same effect as does the harvesting machine, but rather moves ahead of the harvesting machine.

Given that, when a foreign object is detected in the crop material flow, the intake device—a pick-up, in particular—is automatically moved from a working and operating position close to the ground into an at least partially raised turnaround position, crop material jams may be effectively prevented, in particular when the crop material has been laid down in swaths. To amplify this effect, the braking and/or withdrawal of the energy storage medium are preferably carried out simultaneously in order to reduce the ground speed of the harvesting machine.

In an advantageous refinement of the present invention, when the intake device is transferred from the working and operating position close to the ground into an at least partially raised turnaround position, the drive motion of the intake device is reversed. As a result, any crop material already present in the intake device is cleared out via the reversing process, thereby enabling the operator to restart the harvesting operation without losing any more time.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1A depicts a fuel container 17A.

FIG. 1B depicts an oil container 17B.

FIG. 1C depicts a hydrostatic ground drive 17C.

FIG. 1D depicts a partial cutaway view of pickup 4 in a partially raised position with respect to the ground 6.

DESCRIPTION OF THE PREFERRED EMBODIMENTS

Figure 1:
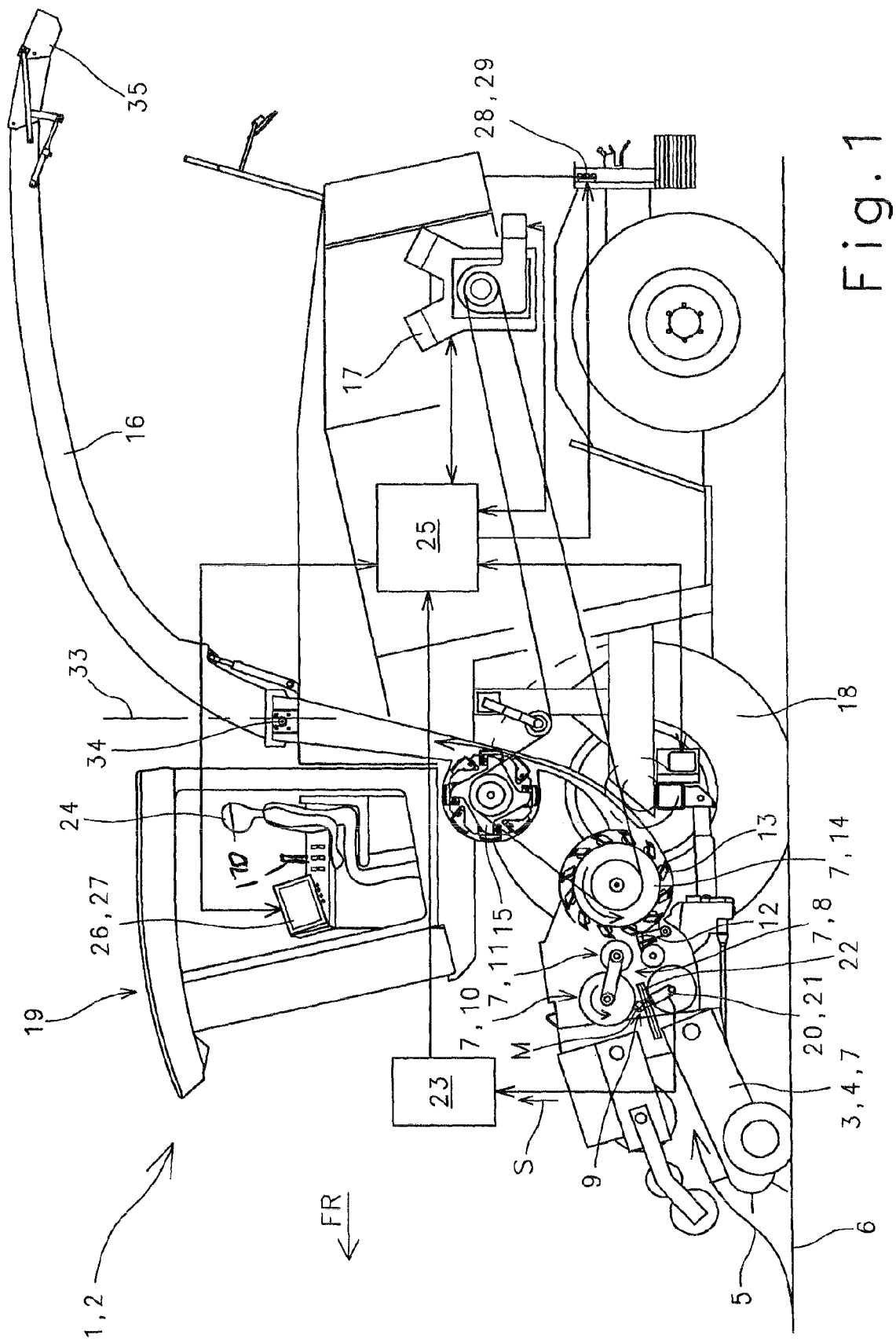
FIG. 1 shows a schematic depiction of an agricultural harvesting machine in the form of a forage harvester with a foreign-object detection device in accordance with the present invention.

FIG. 1 shows an agricultural harvesting machine 1 in the form of a forage harvester 2. A front harvesting attachment 4 designed as a pickup 3 is located in the front—in the direction of travel FR—of forage harvester 2. Using front harvesting attachment 4, crop material 5 is picked up from ground 6 and conveyed to downstream working units 7. Front attachment 4, which is several meters wide, conveys picked-up crop material 5 into a substantially narrower intake region 9, which has the same width as conveying passage 8. In intake area 9, crop material 5 is received and compressed by a first pair of compression rollers 10. A second pair of compression rollers 11 is located downstream of first pair of compression rollers 10. The second pair of compression rollers 11 compresses crop material 5 further into a log of crop material and conveys the crop material log via a shear bar 12 to chopping blades 13 of chopper drum 14.

At shear bar 12, which is located directly in front of chopper drum 14, crop material 5 is cut up by chopping blades 13, accelerated by post-accelerator 15 located downstream of chopper drum 14, and ejected out of forage harvester 2 via an attached transfer device 16, thereby transferring it, e.g., to a not-shown hauling vehicle. The ground drive of harvesting machine 1 takes place via a central drive engine 17. The not-shown transmission is connected with drive wheels 18 of forage harvester 2 via a not-shown drive shaft. The ground speed is regulated using a not-shown ground speed control lever, which is known per se, and which may be designed as a hand or foot lever and is located in driver's cab 19.

A foreign-object detection device 20 designed as a metal detection device 21 is located inside the lower compression roller of the first pair of compression rollers 10, and is used to sense metal objects 22 in the flow of crop material. It is also feasible to design foreign-object detection device 20 as a stone detector. The design and function of a metal detection device 21 known per se is described in greater detail in DE 10 2005 005 736 A1, reference to the entirety of which is hereby made. Metal detection device 21 utilizes a magnetic measurement field M, which is oriented upward into the crop material flow, so that crop material 5 passes through this magnetic field M. Metal object 22 results in a change in magnetic measurement field M that is detected by metal detection device 23. These changes to magnetic measurement field M are transmitted to a not-shown signal module, which generates detection signals S as a function of the voltage changes.

Detection signals S are subsequently transmitted to a signal evaluation device 23. Signal evaluation device 23 is connected with a quick-stop device, which is known per se and is therefore not shown. Quick-stop device ensures that compression rollers 10, 11 and front harvesting attachment 4 are halted immediately. To ensure that metal object 22 is expelled out of forage harvester 2 together with picked-up crop material 5, operator 24 initiates a reversing procedure, in which jointly-driven compression rollers 10, 11 and front attachment 4 are driven in the reverse direction.

Previously, once a foreign object was detected in the crop material flow, harvesting machine 1 was halted by operator 24 himself, but always with a delay based on his reaction time. As a result, harvesting machine 1 with its halted front harvesting attachment 4 and halted intake device 10, 11 has already pushed crop material 5 located in front of it and yet to be harvested several meters forward, thereby resulting in crop material 5 becoming jammed. Operator 24 often must remove these jams manually so that the harvesting operation may continue once the foreign object has been removed from the crop material flow and/or working units 7. This results in a great deal of time being lost from the harvesting operation.

The present invention applies here, by providing that, when foreign-object detection device 20 detects a foreign object in the crop material flow, harvesting machine 1 is braked automatically and/or the at least one energy storage medium is withdrawn in order to reduce the ground speed of agricultural harvesting machine 1, thereby ensuring that crop material 5—such as grass that has been laid down in swaths—is largely prevented from becoming jammed, and that crop material 5 yet to be harvested, such as corn, is largely prevented from being driven over and pressed into the ground.

The at least one energy storage medium may be the fuel used to operate drive engine 17 (for example, fuel contained in a fuel container 17A, as shown in FIG. 1A), which provides the drive power for the ground drive, and/or the oil for operating a hydrostatic ground drive (for example, fuel contained in a oil container 17B, as shown in FIG. 1B), as is known with harvesting machines and is therefore not described in greater detail. A block 17C is shown in FIG. 1C to represent a hydrostatic ground drive, which is powered by drive engine 17, as understood by the skilled artisan.

Preferably, the value for the braking effect and/or the withdrawal of the energy storage medium is adjustable, so that, due to the option of varying the setting, the optimal setting for a particular situation or harvesting condition may always be selected. To this end, foreign-object detection device 20 is connected with a control device 25 for controlling the braking effect of the braking device—which is known per se and is therefore not described in greater detail—and/or to control the withdrawal of the energy storage medium, control device 25 being designed as a ground speed control lever 17D for reducing the ground speed of harvesting machine 1. Detection signal S is transmitted to control device 25 and stored in control device 25. Control device 25 is also connected with an adjustment device 26 and the quick-stop device.

Adjustment device 26 is used to adjust the value for the braking effect and/or the value for the withdrawal of the energy storage medium in order to reduce the ground speed of harvesting machine 1 when a foreign object is detected. It is basically provided that the braking and/or withdrawal of the at least one energy storage medium carried out to reduce the ground speed of harvesting machine 1 is performed until harvesting machine 1 has come to a standstill. It is also feasible, however, that a freely definable ground speed range is not fallen below. Threshold values may be entered in adjusting device 26 connected with control device 25 depending on harvesting operation parameters and used as the basis for adjusting the values for the braking effect and/or for the withdrawal of the energy storage medium when a foreign object is detected. The threshold values may be set by operator 24, who may also change them as he sees fit.

Possible harvesting operation parameters include, in particular, the crop material type, the ground speed of agricultural harvesting machine 1 per se, or the incline of the field of crops, thereby making it possible to advantageously relieve the operator of agricultural harvesting machine 1 of duties by ensuring that the threshold values of the harvesting operation parameters are set exactly and in accordance with current harvesting conditions. Driving speeds differ, in particular, depending on the crop material types, e.g., a higher ground speed for harvesting grass than for harvesting corn. When the ground speed is higher, a lower value is always set, in order to prevent harvesting machine 1 from stopping abruptly from a higher ground speed, since this could result in serious injury to operator 24.

Adjustment device 26 may be designed such that the threshold values of the harvesting operation parameters may be entered manually by operator 24 from inside driver's cab 19 using a control panel 27. It is also feasible for the threshold values of the harvesting operation parameters to be registered automatically via related, not-shown sensors, thereby relieving operator 24 of the task of monitoring the harvesting operation parameters and allowing him to concentrate solely on the harvesting operation.

It is also provided that the values for the braking effect and/or the withdrawal of the energy storage medium in order to reduce the ground speed are adjusted depending on the inclination of the field of crops, so that, when traveling downhill in particular, it is also possible to avoid stopping harvesting machine 1 too abruptly and therefore having front harvesting attachment 4 of harvesting machine 1 come in contact ground 6, thereby preventing damage to the crops to be harvested and to front harvesting attachment 4. In addition, it is also possible to consider the harvesting speed of harvesting machine 1 and the weight of front harvesting attachment 4 when adjusting the value for the braking effect and/or the withdrawal of the energy storage medium in order to prevent—for a very large and heavy front harvesting attachment 4 in particular—an extreme forward lean due to harvesting machine 1 being stopped abruptly, in order to prevent damage from occurring to front harvesting attachment 4. In addition, the value for the braking effect and/or the reduction in ground speed may be adjusted depending on the inclination of the field of crops, so that, when traveling downhill in particular, it is also possible to prevent harvesting machine 1 from stopping abruptly and, therefore, to prevent front harvesting attachment 4 of the harvesting machine from coming in contact with ground 6, in order to therefore prevent damage from occurring to the crops to be harvested and to front harvesting attachment 4.

It is also provided that the braking and/or withdrawal of the energy storage medium is carried out to reduce the ground speed of harvesting machine 1 depending on the speed setpoint value specified via the ground speed control lever. Given that operator 24 is therefore already accustomed—even before a foreign object has been detected—to the effect of the braking procedure in order to reduce the ground speed when a foreign object has been detected, it is largely possible to avoid potential injury to operator 24. In the simplest case, it may be provided that, when a foreign object has been detected, control device 25 automatically actuates the foot brake using suitable, not-shown means, thereby making it possible to easily brake harvesting machine 1 and to therefore avoid crop material 5 from becoming jammed. It is also feasible that, when a foreign object is detected in the crop material flow, not only is braking carried out and/or is the energy storage medium withdrawn in order to reduce the ground speed, but the engine speed of drive engine 17 is also reduced, as an additional means of reducing the ground speed of harvesting machine 1.

In addition, when a foreign object is detected in the crop material flow, the reduction in ground speed may be signalled acoustically and/or optically using at least one signal means 29, which are designed as brake light device 28 in this case, thereby ensuring that the operators of vehicles traveling behind harvesting machine 1 are warned via the illumination of brake light device 28, thereby enabling them to initiate a braking procedure themselves in timely fashion, to avoid colliding with the harvesting machine.

In a further embodiment, when a foreign object is detected in the crop material flow, front harvesting attachment 4—which is designed as a pickup 3 in this case—is automatically transferred from the not-shown working and operating position into a not-shown, at least partially raised turnaround position, thereby ensuring that, e.g., crop material 5 that has been set down in swaths, such as grass, does not become piled up, even though harvesting machine 1 continues to move forward. It is also feasible that, when pickup 4 is moved from the working and operating position into an at least partially raised turnaround position (pickup 4 shown partially raised in FIG. 1D), harvesting machine 1—as shown in FIG. 1 —is simultaneously braked, and/or the energy storage medium is withdrawn in order to reduce the ground speed, thereby very effectively preventing crop material 5 from becoming jammed when a foreign object is detected. Preferably, when front harvesting attachment 4 is transferred from the working and operating position close to the ground into an at least partially raised turnaround position, the drive motion of working units 7 is reversed. As a result, any crop material 5 already present in working units 7 is cleared out via the reversing process, thereby enabling operator 24 to restart the harvesting operation without losing any more time.

Figure 2:
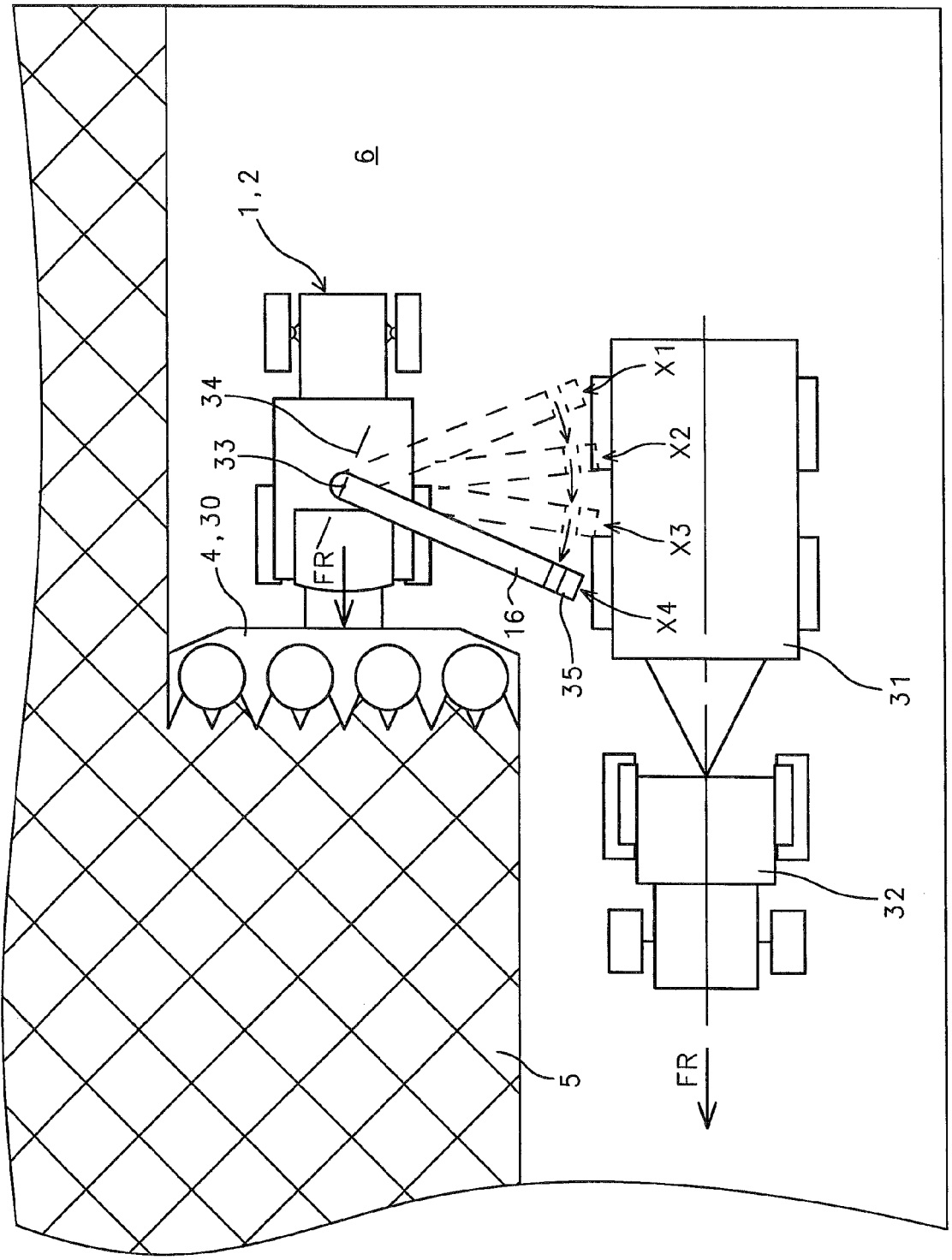
FIG. 2 shows a view of an agricultural harvesting machine designed as a forage harvester with a hauling vehicle—a tractor, in this case—traveling next to it in accordance with the present invention.

A forage harvester 2 is shown in FIG. 2, in a top view. A front harvesting attachment 4, which is a corn header 30 in this case, is assigned to the front of the forage harvester. Front harvesting attachment 4 cuts and collects crop material 5, and conveys it to a not-shown chopping device. Chopped crop material 5 is then transferred via a transfer device 16 to a hauling device 31. Hauling device 31 is adapted to a tractor 32 which, in the ideal case, is driven parallel alongside or directly behind (not shown) forage harvester 2. In a manner known per se, transfer device 16 located behind driver's cab 19 is capable of being rotated around a vertical axis of rotation 33 and, to adjust the height, it is capable of being displaced along a horizontal axis 34. In addition, the distance of the crop discharge flow may be controlled by a transfer-device cover 35, which may be raised or lowered.

When transfer-device cover 35 is pivoted upward, the stream of crop material is ejected further. When transfer-device cover 35 is pivoted downward, the stream of crop material is ejected less further. During the harvesting operation, operator 24 of an agricultural harvesting machine 1 is faced with the problem that, when a foreign object is detected, harvesting machine 1 is braked, but crop material 5 is still being ejected via transfer device 16. In the typical case, the operator of hauling device 31 traveling alongside does not initiate the braking procedure at the same time as harvesting machine 1 when a foreign object is detected. As a result, it loses its ideal position and moves ahead of harvesting machine 1. Crop material 5 yet to be transferred is not ejected into hauling device 31, but rather onto ground 6 behind hauling device 31.

According to the present invention, it is now provided that, when transfer device 16 assumes a lateral transfer position X1-X4 and a foreign object is detected, transfer device 16 is swiveled into direction of travel FR, so that transfer device 16 follows hauling vehicle 32—which is moving ahead—and the remainder of crop material 5 located in harvesting machine 1 may be ejected into hauling device 31. Lateral transfer position X1 depicts a rear transfer position of transfer device 16. The swiveling of transfer device 16 is preferably carried out in the same ratio as the braking and/or reduction in ground speed of harvesting machine 1 when a foreign object is detected in the crop material flow, thereby ensuring that the not-shown contact point of the crop material flow in hauling vehicle 31 may be hit.

When hauling device 31 is located behind harvesting machine 1 and transfer device 16 assumes a not-shown rear position during the harvesting operation, when a foreign object is detected by foreign-object detection device 20, the braking and/or reduction in ground speed of harvesting machine 1 takes place after the foreign object is detected, thereby enabling the operators of hauling vehicles 32 traveling behind harvesting machine 1 to initiate a braking procedure themselves in a timely manner and avoid colliding with harvesting machine 1.

It is within the scope of the ability of one skilled in the art to modify the exemplary embodiment described in a manner not presented, or to use it in other machines to achieve the effects described, without leaving the framework of the present invention.

It will be understood that each of the elements described above, or two or more together, may also find a useful application in other types of constructions differing from the type described above.

While the invention has been illustrated and described as embodied in an agricultural harvesting machine with a foreign-object detection, it is not intended to be limited to the details shown, since various modifications and structural changes may be made without departing in any way from the spirit of the present invention.

Without further analysis, the foregoing will so fully reveal the gist of the present invention that others can, be applying current knowledge, readily adapt it for various applications without omitting features that, from the standpoint of prior art, fairly constitute essential characteristics of the generic or specific aspects of this invention.

The invention claimed is:

1. An agricultural harvesting machine for one of harvesting and processing crop material, comprising a transfer device for transferring a crop material; an intake device including a foreign-object detection device for detecting foreign objects in a monitoring region of a crop material flow; means for braking the agricultural harvesting machine; means for withdrawing at least one energy storage medium in order to reduce the ground speed when a foreign object of the crop material flow is detected by said foreign-objection detection device; means for adjusting a value of a braking effect implemented by said means for braking; and means for adjusting a value of a braking effect implemented by said means for withdrawing said energy storage medium.

2. An agricultural harvesting machine as defined in claim 1, wherein said at least one energy storage medium is a medium selected from the group consisting of a fuel used to operate a drive engine of the agricultural harvesting machine, an oil used to operate a hydrostatic ground drive, and both.

3. An agricultural harvesting machine as defined in claim 1, wherein said means for adjusting is configured so that the braking and/or withdrawal of at least one energy storage medium are adjustable depending on at least one threshold value.

4. An agricultural harvesting machine as defined in claim 3, wherein said means for adjusting is configured so that as said at least one threshold value, a value is utilized selected from the group consisting of a crop material type, a ground speed of the agricultural harvesting machine, a weight of a front harvesting attachment, and an incline of a field of crops.

5. An agricultural harvesting machine as defined in claim 3; and further comprising means for setting said at least one threshold value in a manner selected from the group consisting of setting manually and setting automatically.

6. An agricultural harvesting machine as defined in claim 1, wherein said means for braking the agricultural harvesting machine means for withdrawing the at least one energy storage medium to reduce the ground speed of the agricultural harvesting machine is configured so that a braking and a withdrawal are performed depending on a speed setpoint value specified via a ground speed control lever.

7. An agricultural harvesting machine as defined in claim 1; and further comprising signal means configured so that when a foreign object is detected in the crop material flow, a reduction of the ground speed is indicated in a manner selected from the group consisting of acoustically, optically, and both using said signal means.

8. An agricultural harvesting machine as defined in claim 7, wherein said signal means is configured as a brake light device of the agricultural harvesting machine.

9. An agricultural harvesting machine as defined in claim 1, wherein said means for braking and said means for withdrawing are configured so that a reduction of the ground speed takes place after a foreign object is detected in the crop material flow, when said transfer device is located in a rear transfer position.

10. An agricultural harvesting machine as defined in claim 1, wherein said transfer device is configured so that, given a lateral transfer position of said transfer device when a foreign object is detected in the crop material flow, said transfer device is swivelled in a direction of travel, and the swivelling of said transfer device is carried out based on a value of one of the braking effect and the withdrawing of the at least one energy storage medium to reduce the ground speed of the agricultural harvesting machine.

11. An agricultural harvesting machine as defined in claim 1, wherein said foreign-object detection device is configured as a device selected from the group consisting of a stone detection device, a metal detection device, and both.

12. An agricultural harvesting machine as defined in claim 1, wherein said means for braking the agricultural harvesting machine and the means for withdrawing the at least one energy storage medium also are configured so that when a foreign object is detected in the crop material flow by said foreign-object detection device, said intake device is moved from a working and operating position close to a ground into a turnaround position, which is at least partially raised.

13. An agricultural harvesting machine as defined in claim 12, wherein said intake device which is moved when a foreign object is detected in the crop material flow by said foreign-object detection device is configured as a pick-up.

14. An agricultural harvesting machine as defined in claim 1, wherein said means for braking the agricultural harvesting machine and the means for withdrawing are configured so that the braking effect and the withdrawing of the at least one energy storage medium to reduce the ground speed takes place simultaneously.

15. An agricultural harvesting machine as defined in claim 13, wherein said intake device is configured so that a transfer of said intake device from a working and operating position close to the ground into at least partially raised turnaround position is performed in a manner selected from the group consisting of manually by an operator and automatically using a control device.

16. An agricultural harvesting machine as defined in claim 14, wherein said intake device is configured so that when said intake device is transferred from the working and operating position close to the ground into an at least partially raised turnaround position, a drive motion of said intake device is reversed.

* * * * *